United States Patent [19]

Sasaki et al.

[11] Patent Number: 5,530,882
[45] Date of Patent: Jun. 25, 1996

[54] MULTI-PURPOSE INFORMATION PROCESSING SYSTEM

[75] Inventors: Akitomo Sasaki, Kawasaki; Hiroshi Okazaki, Yokohama, both of Japan

[73] Assignee: Canon Kabushiki Kaisha, Tokyo, Japan

[21] Appl. No.: 38,215

[22] Filed: Mar. 29, 1993

[30] Foreign Application Priority Data

Mar. 30, 1992 [JP] Japan .................................... 4-073756

[51] Int. Cl.⁶ .................................................. G06F 15/21
[52] U.S. Cl. .................... 395/800; 235/380; 364/DIG. 1; 364/243; 364/232.8
[58] Field of Search ........................ 395/800, 275, 395/425, 700, 725; 235/380, 492, 438; 380/4, 23

[56] References Cited

U.S. PATENT DOCUMENTS

| | | | |
|---|---|---|---|
| 4,777,355 | 10/1988 | Takahira | 235/380 |
| 4,782,514 | 11/1988 | Oshikata et al. | 379/165 |
| 5,038,025 | 8/1991 | Kodera | 235/492 |
| 5,126,541 | 6/1992 | Shinagawa | 235/438 |
| 5,168,151 | 12/1992 | Nara | 235/492 |

*Primary Examiner*—Mehmet Geckil
*Attorney, Agent, or Firm*—Fitzpatrick, Cella, Harper & Scinto

[57] ABSTRACT

An information processing system has a first processing apparatus and a detachably connected second processing apparatus. The first processing apparatus has an input unit for entering information and commands, a first processor for executing a process based on the information and command entered from the input unit, and an output unit for releasing the results of such execution, while the second processing apparatus has a second processor for executing a process based on the information and commands entered from the input unit and transferring the results of that execution to the output unit. The second processing apparatus can execute a process which cannot be executed by the first processing apparatus, utilizing the input/output equipment of the first processing apparatus.

12 Claims, 5 Drawing Sheets

MULTI-PURPOSE INFORMATION PROCESSING SYSTEM

BACKGROUND OF THE INVENTION

1. Field of the Invention

The present invention relates to an information processing system capable of easily varying the specifications according to various objectives.

2. Related Background Art

The conventional information processing apparatus cannot satisfy the requirements of all applications but has to be designed independently in each case for which the required architecture of CPU is different, for example for word processing and for CAD (computer aided design). Stated differently, plural information processing apparatus of different specifications have to be prepared according to the respective applications intended.

It is, however, not possible to install, on a personal desk, plural sets of the information processing apparatus each consisting not only of the main body including the CPU but also of a display unit, an external memory device such as a floppy disk drive, a keyboard and a mouse. For certain apparatus, therefore, the user has to move to the place of installation thereof for operation. Also, the installation of plural apparatus for different applications gives rise to a high cost and requires much space.

On the other hand, for simply meeting all the application with one apparatus, it becomes necessary to reconstruct the programs, originally designed for CPU's of different specifications, for such apparatus, and there is required a tremendous amount of work for such reconstruction.

SUMMARY OF THE INVENTION

In consideration of the foregoing, an object of the present invention is to provide an information processing apparatus capable of meeting various purposes, without requiring a wide space for installation.

Another object of the present invention is to provide a compact multi-function system, in which equipment are commonly used by plural information processing apparatus constituting the system.

According to one aspect, the present invention which achieves these objectives relates to an information processing system provided with a first information processing apparatus, and a second information processing apparatus detachably connected to the first information processing apparatus, wherein the first information processing apparatus comprises input means for entering information and instructions, first process means for executing a process based on the information and the instructions entered from the input means, and output means for releasing the information entered from the input means and the result of process of the process means, and the second information processing apparatus comprises second process means for executing a process based on the information and the instructions entered from the input means and transferring the result of the process to the output means.

According to another aspect, the present invention which achieves these objectives relates to an information processing method comprising steps of connecting a second information processing apparatus to a first information processing apparatus, selecting, in the first information processing apparatus, a program to be executed by the second information processing apparatus, loading the selected program in the second information processing apparatus, executing the loaded program by the second information processing apparatus, transferring the result of the execution to the first information processing apparatus, and releasing thus transferred result of execution from the first information processing apparatus.

According to still another aspect, the present invention which achieves these objectives relates to an information processing method comprising steps of connecting a second information processing apparatus to a first information processing apparatus, selecting, in the first information processing apparatus, a program to be executed by the second information processing apparatus, loading the selected program into a memory of the first information processing apparatus, executing the program, loaded in the memory, by the second information processing apparatus, transferring the result of execution to the first information processing apparatus, and releasing the transferred result of execution from the first information processing apparatus.

Other objectives and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

In the following there will be explained embodiments of the present invention, with reference to the attached drawings.

1st Embodiment

Description of Configuration (FIGS. 1 to 4)

Figure 1:
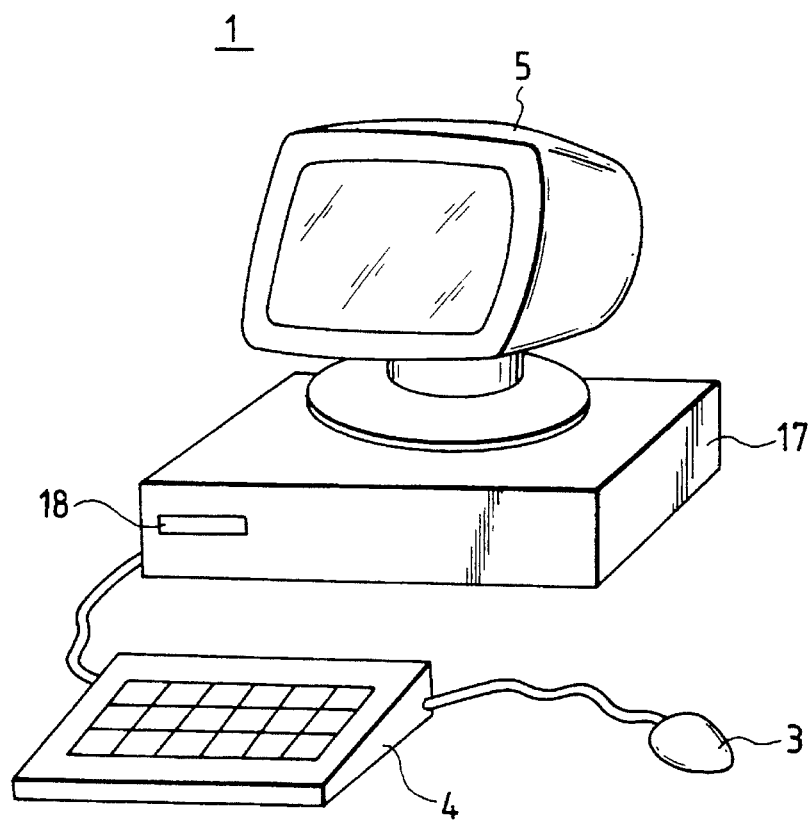
FIG. 1 is an external view of a multi-purpose information processing apparatus embodying the present invention.
Figure 2:
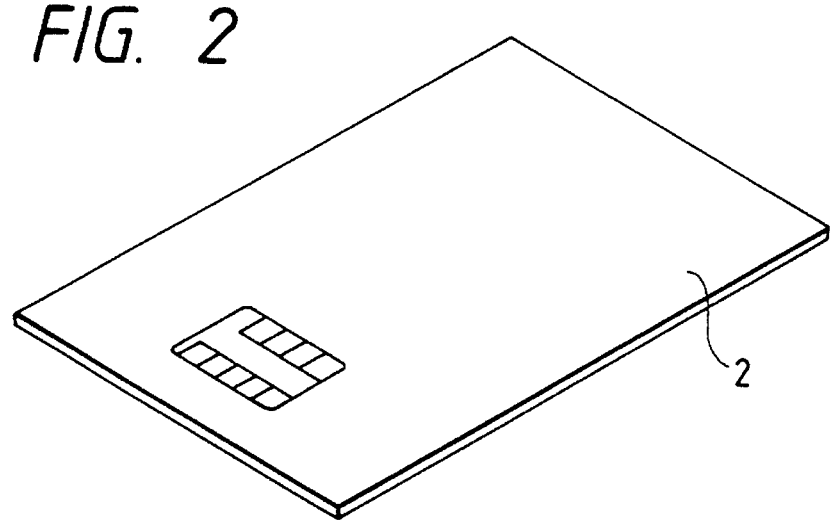
FIG. 2 is an external view of an embodiment of the IC card.

FIG. 1 is an external view of a main body 1 of a multi-purpose information processing apparatus constituting an embodiment of the present invention. The main body 1 of the present embodiment is composed of a display 5, a casing 17 accommodating a CPU, a memory etc. and provided with an IC card slot 18 to be explained later, a mouse 3, and a keyboard 4. The IC card slot 18 receives an IC card 2 of which external view is shown in FIG. 2. The main body 1 and the IC card 2 of the present embodiment function integrally in a state in which the IC card 2 is inserted in the IC card slot 18, at the software loading or at the display of result of software execution, as will be explained later.

Figure 3:
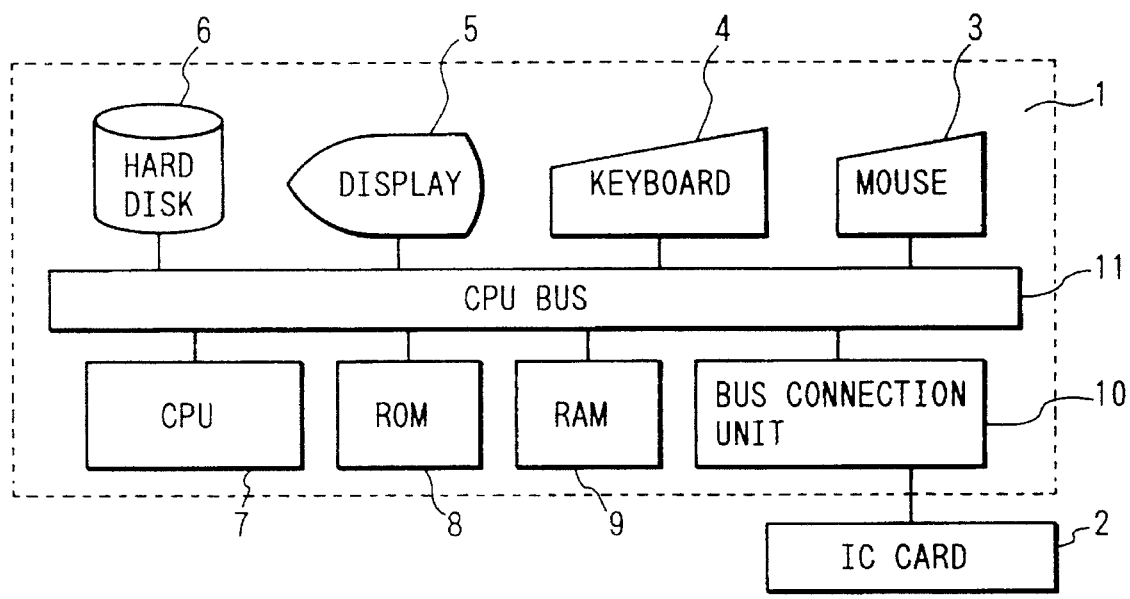
FIG. 3 is a block diagram of the multi-purpose information processing apparatus of a first embodiment.

FIG. 3 is a block diagram of the configuration of the main body 1, wherein shown are an IC card 2 provided with a CPU and a memory; a mouse 3 for enabling the user to indicate a coordinate position on the information display frame; a keyboard 4 for enabling the user to enter information and instruction; a display unit 5 for displaying information; a hard disk 6 constituting a secondary memory device for storing programs etc.; a CPU 7 for controlling various units of the apparatus and executing various processes; a ROM 8 for storing fixed data; a RAM 9 for temporary data storage; a bus connection unit 10 constituting an interface for connecting the IC card 2 with the main body 1; and a CPU bus 11 to which the above-mentioned units are connected. Among the above-mentioned components, the CPU 7, ROM 8, RAM 9, hard disk 6, CPU bus 11, and bus connection unit 10 are housed in the casing 17.

Figure 4:
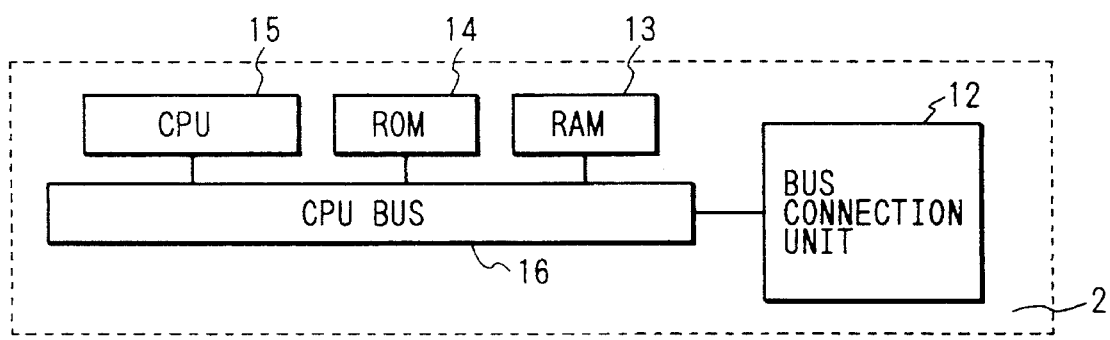
FIG. 4 is a block diagram of an embodiment of the IC card.

FIG. 4 is a block diagram of the IC card 2, wherein shown are a bus connection unit 12 to be explained later; a RAM 13; a ROM 14; a CPU 15; and a CPU bus 16 of a function same as that in the main body 1. As will be apparent from FIGS. 3 and 4, the CPU bus 16 of the IC card 2 is physically connected with the CPU bus 11 of the main body 1 through the bus connection unit 12 of the IC card 2 and the bus connection unit 10 of the main body 1, whereby the information exchange is enabled between the main body 1 and the IC card 2.

Figure 5:
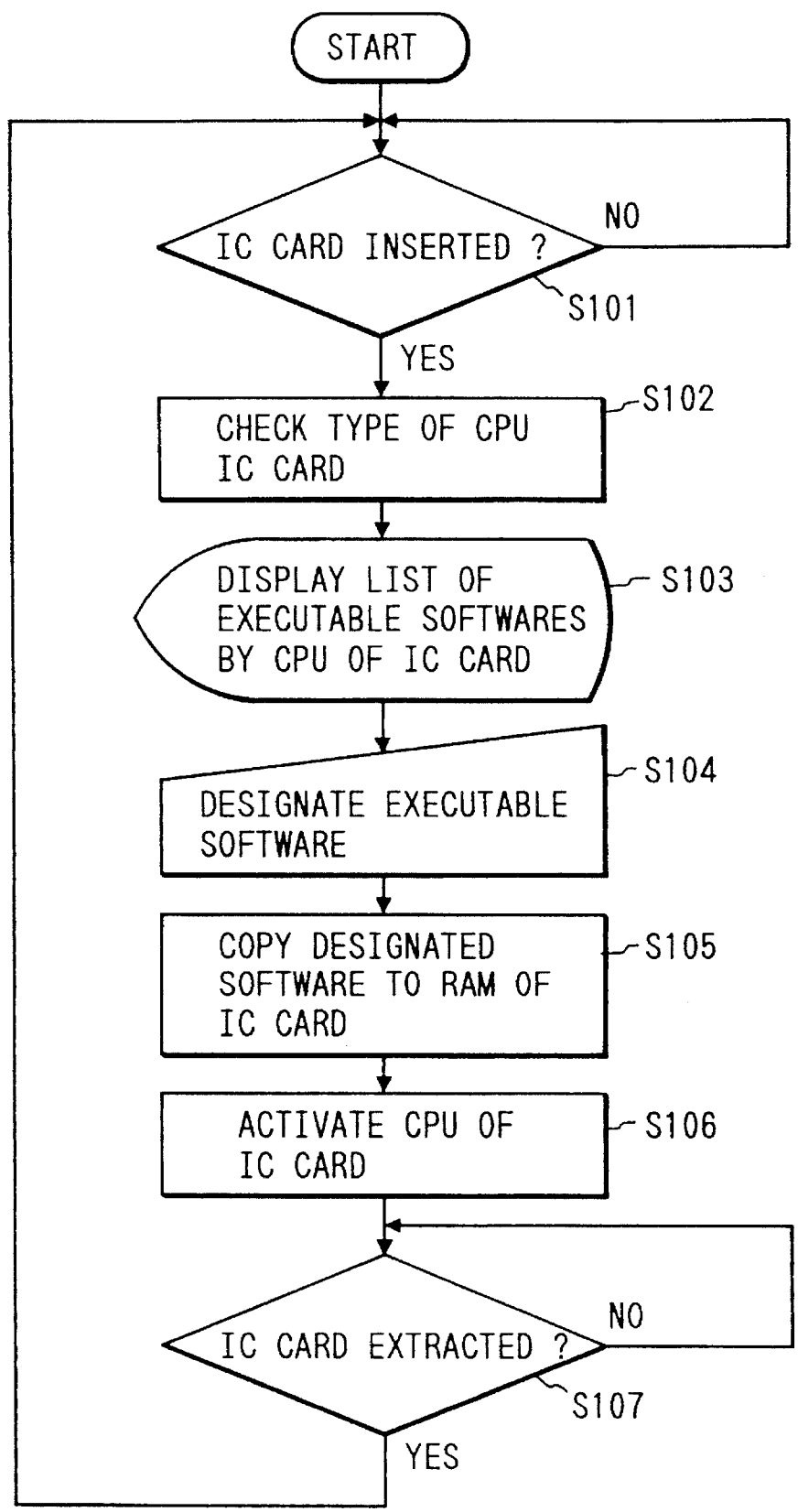
FIG. 5 is a flow chart of data processing in the first embodiment.

Explanation on the Execution of Specified Process (FIG. 5)

Now reference is made to a flow chart shown in FIG. 5, for explaining how the multi-purpose information processing apparatus of the above-explained configuration can achieve multiple functions. The main body 1 of the present embodiment can load the RAM 13 of the IC card 2 with various softwares (programs) selected by the user, through the bus connection units 10, 12, thereby causing the IC card 2 to execute such loaded software.

When the main body is activated, a step S101 awaits the insertion of the IC card. Upon insertion of the IC card 2 into the main body 1, the insertion is detected and a step S102 investigates the type of the CPU of the inserted IC card 2. Based on the result of analysis of the CPU type in the step S102, a step S103 displays, among the softwares stored in the hard disk 6, a list of the names of the softwares executable by the CPU 15 of the IC card 2, on the display unit 5, and asks the user to select a software to be executed. The software can be an application software such as of a word processor or a CAD, or an operation system such as UNIX™ or MS-DOS™.

In a step S104, the user instructs a software to be executed, among those displayed, through the keyboard 4 or the mouse 3. In response, a step S105 reads the designated to software from the hard disk 6 and copies the content of the software in the RAM 13 of the IC card 2. The copying includes not only the codes of the software but also the parameters and data required for the execution thereof.

Upon completion of the copying, a step S106 activates the CPU 15 of the IC card 2. A next step S107 discriminates whether the IC card 2 has been extracted from the IC card slot 18, and the sequence waits until the IC card 2 is extracted from the IC card slot 18. When the extraction of the IC card 2 is confirmed, the sequence returns to the step S101. Thereafter another IC card may be inserted into the IC card slot 18 for executing another process, or the same IC card may be inserted again to obtain the result of execution in the IC card. In the above-explained manner, the CPU 15 of the IC card 2 can execute, utilizing the equipment of the main body 1, programs which cannot be executed by the CPU 7 of the main body 1, whereby functions for various applications can be realized. Also the keyboard 4 or the mouse 3 is used, if the entry of data or instructions is required at the execution. The execution of the program, loaded in the RAM 13, by the CPU 15 can be conducted in the IC card 2, independently from the main body 1, if the access to the hard disk 6, display unit 5, keyboard 4, mouse 3 etc. of the main body 1 is not required in the execution. Consequently, for a program of a high CPU load and a long execution time, the program loading and the entry of the calculation parameters are conducted by the main body 1, and the IC card 2 may be detached from the main body 1.

Consequently it is possible also to insert another IC card for executing another process, or to execute another program in the main body 1. It is thus made possible to avoid exclusively occupying various input/output equipment of the main body 1, but to execute various processes in simultaneous and efficient manner.

2nd Embodiment

In this embodiment there will be explained a case of executing a specified process, employing an IC card not equipped with a RAM. Since this embodiment also employs the multi-purpose information processing apparatus of the preceding embodiment as a common apparatus, the processing apparatus will not explained further, and components of the apparatus will be referred to by the same numbers as in the foregoing embodiment. Also same process steps as in the foregoing embodiment will be represented by same step numbers and will not be explained further.

Figure 6:
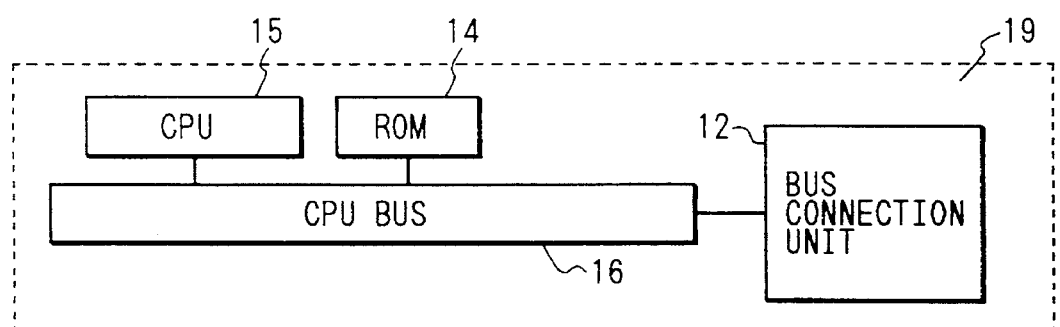
FIG. 6 is a block diagram of a second embodiment of the IC card.

FIG. 6 is a block diagram of an IC card 19 to be employed in the present embodiment. As will be apparent from FIG. 6, the configuration of the IC card 19 is only different from that of the IC card 2 in the foregoing embodiment, by the absence of the RAM, so that the components of the IC card 19 are represented by same numbers for those of the IC card 2.

Figure 7:
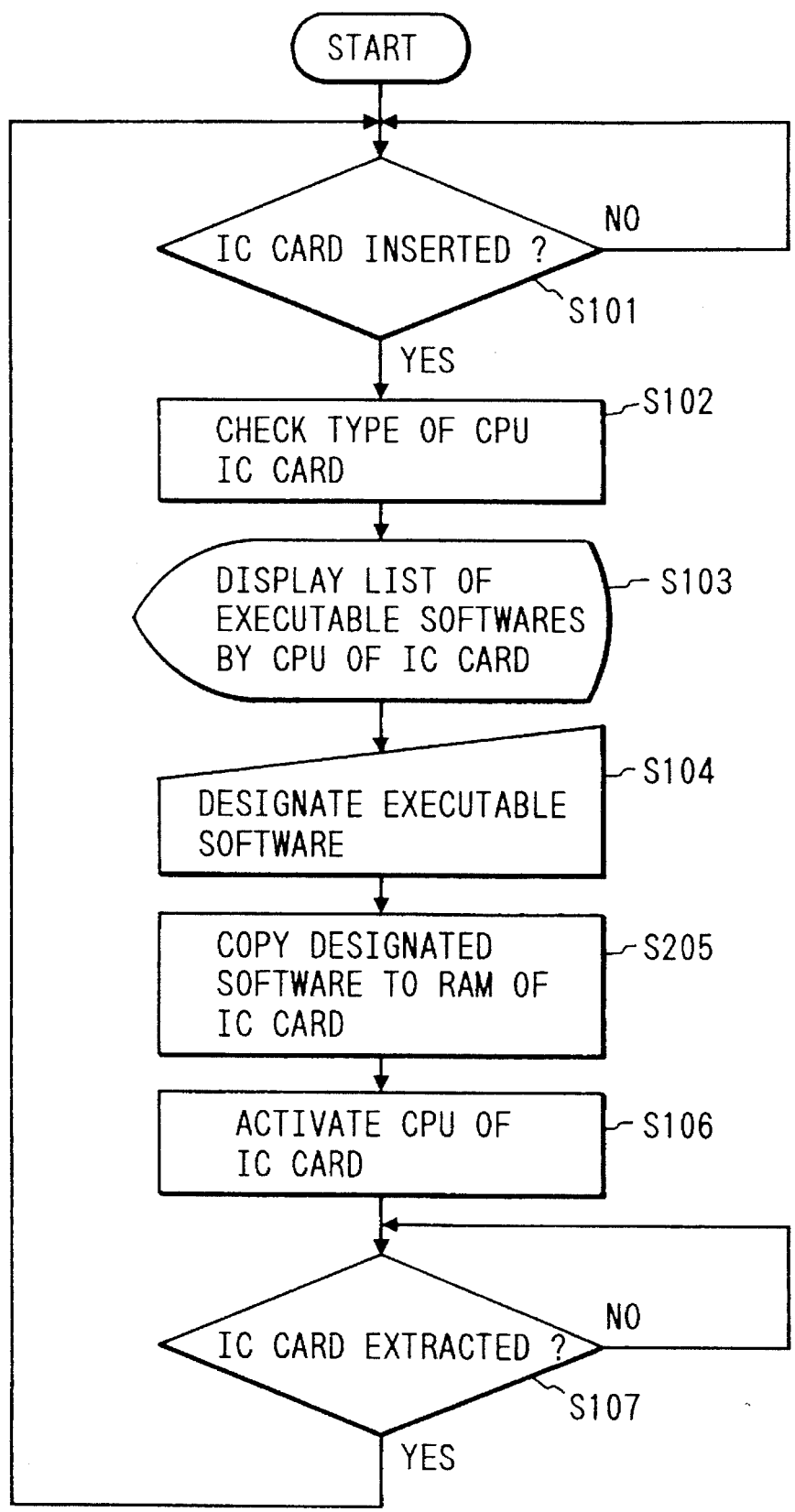
FIG. 7 is a flow chart of data processing in a second embodiment.

FIG. 7 is a flow chart for executing a specified process with the IC card of the present embodiment. In this embodiment it is assumed to insert the IC card 19 in the main body 1 and to cause the CPU 15 of the IC card 19 to execute a specified process.

After the steps S101–S104 same as those in the foregoing embodiment, a step S105 of this embodiment copies the designated software from the hard disk 6 of the main body 1 to the RAM 9. Thus the CPU 15 of the IC card 19 executes the specified process, utilizing the RAM 9. Subsequent steps S106 to S107 are same as those in the foregoing embodiment.

Therefore, in the present embodiment the IC card 19 cannot be extracted from the main body 1 during the executing operation of the CPU 15, but the load can be shared by the CPU 7 of the main body 1 and the CPU 15 of the IC card 19 in a specified task. Also the cost of the IC card 19 can be lowered because of the absence of the RAM.

3rd Embodiment

Figure 8:
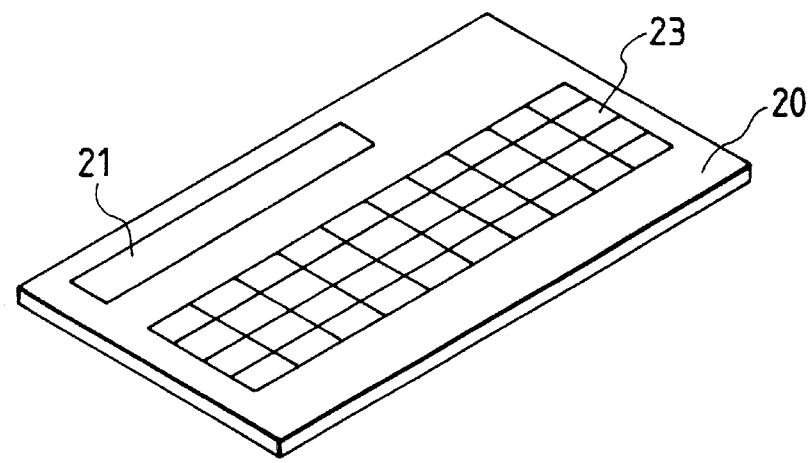
FIG. 8 is an external view of the IC card in a third embodiment.
Figure 9:
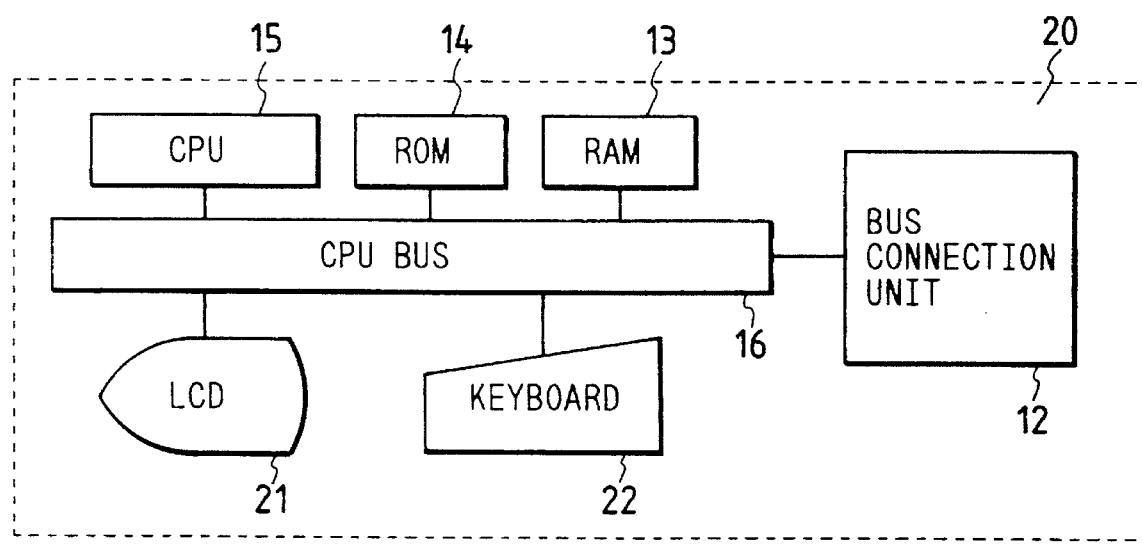
FIG. 9 is a block diagram of the IC card in the third embodiment.

The IC card explained in the foregoing two embodiments is not equipped with units for display or instruction of information, but the present invention is not limited by such embodiments. It is also possible to utilize an IC card 20 equipped with a small LCD (liquid crystal display) unit and a keyboard, of which external view and configuration are respectively shown in FIGS. 8 and 9, in which illustrated are an LCD 21, and keys 23 of a keyboard 22.

Connection of such IC card 20 with the main body 1 enables the execution of complex process, which cannot be executed by the IC card 20 alone, due to poor input/output unit. For example, it is rendered possible to effect the loading of the program or the initial execution parameters to the IC card through the main body 1, then to detach the IC card 20 from the main body 1, and to effect the entry of additional parameters required for the program execution and the simple output of the results of calculation by means of the LCD 21 and the keyboard 22 provided on the IC card 20, without connection to the main body 1.

According to the present invention, as explained in the foregoing, a first processor provided with input/output equipment such as keyboard and display unit and with a memory such as a hard disk is connected with an extremely small second processor which is formed for example in a card form and not equipped with complex input/outout equipment or a memory of a large capacity, and the second processor receives a program necessary for program execution from the first processor and effects necessary input/output operations through the first processor. Thus, an inexpensive apparatus capable of achieving various objectives without a wide space for installation can be realized by preparing second processors suitable for various applications and connecting such second processors to the first processor.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An information processing system provided with an input/output apparatus, and an IC card structured so as to be detachably connectable to said input/output apparatus, wherein said IC card comprises:
first memory means for storing a program;
first processing means for executing the program stored in said first memory means; and
transferring means for transferring a result of an execution of the program by said first processing means to said input/output apparatus; and wherein said input/output apparatus comprises:
second memory means for storing a plurality of programs;
display means for displaying information; and
second processing means which includes:
determining means for determining a type of said processing means comprised in said IC card;
list display means for displaying on said display means a list of names of programs executable by said first processing means among the plurality of programs stored in said second memory means on the basis of the type determined by said determining means;
selecting means for selecting a program to be executed by said first processing means, in response to a designation of a name of the program to be executed in the list displayed by said list display means;
loading means for loading the program selected by said selecting means from said second memory means into said first memory means; and
result display means for displaying on said display means the result of the execution of the program transferred from said IC card to said input/output apparatus.

2. An information processing system according to claim 1, wherein said input/output apparatus further comprises:
detection means for detecting a connection between said IC card and said input/output apparatus; and
control means for controlling said determining means to execute a determination in response to a detection by said detection means.

3. An information processing system according to claim 1, wherein said input/output apparatus further comprises input means for inputting data and instructions used for executing the program by said processing means.

4. An information processing system provided with an input/output apparatus, and an IC card structured so as to be detachably connectable to said input/output apparatus, wherein said IC card comprises first processing means for executing programs; and wherein said input/output apparatus comprises:
disk memory means for storing a plurality of programs;
random access memory means for storing a program to be executed by said first processing means and a result of executing the program;
display means for displaying information; and
second processing means which includes:
determining means for determining a type of said first processing means comprised in said IC card;
list display means for displaying on said display means a list of names of programs executable by said first processing means among the plurality of programs stored in said disk memory means on the basis of the type determined by said determining means;
selecting means for selecting a program to be executed by said first processing means, responsive to a designation of a name of the program to be executed in the list displayed by said list display means;
loading means for loading the program selected by said selecting means from said disk memory means into said random access memory means; and
result display means for reading the result of executing the program from said random access memory means and displaying the result on said display means.

5. An information processing system according to claim 4, wherein said input/output apparatus further comprises:
detection means for detecting a connection between said IC card and said input/output apparatus; and
control means for controlling said determining means to execute a determination in response to a detection by said detection means.

6. An information processing system according to claim 4, wherein said input/output apparatus further comprises input means for inputting data and instructions used for executing the program by said processing means.

7. An information processing method by using an IC card provided with a processor and a first memory, and an input/output apparatus provided with an input device, a display and a second memory, said method comprising the steps of:
connecting the IC card to the input/output apparatus by a user;

determining a type of the processor;

displaying a list of names of programs executable by the processor among a plurality of programs stored in the second memory on the display on the basis of the type determined in said determining step;

designating, via the input device by the user, a name of a program to be executed in the list displayed on the display;

selecting the program to be executed based on the name designated in said designating step;

loading the program selected in said selecting step from the second memory into the first memory;

executing the program stored in the first memory, by means of the processor;

transferring a result of execution of the program by the processor to the input/output apparatus; and displaying the result transferred from the IC card.

8. An information processing method according to claim 7, further comprising the step of detecting a connection between the IC card and the input/output apparatus, and wherein said determining step is executed in response to a detection in said detection step.

9. An information processing method according to claim 7, further comprising the step of inputting data and instructions used for executing the program by means of the input device.

10. An information processing method by using an IC card provided with a processor, and an input/output apparatus provided with an input device, a display, a random access memory and a disk memory, said method comprising the steps of:

connecting the IC card to the input/output apparatus by a user;

determining a type of the processor;

displaying a list of names of programs executable by the processor among a plurality of programs stored in the disk memory on the display on the basis of the type determined in said determining step;

designating, via the input device by the user, a name of a program to be executed in the list displayed on the display;

selecting the program to be executed based on the name designated in said designating step;

loading the program selected in said selecting step from the disk memory into the random access memory;

executing the program stored in the random access memory by the processor; and displaying a result of execution of the program by the processor on the display.

11. An information processing method according to claim 10, further comprising the step of detecting a connection between the IC card and the input/output apparatus, and wherein said determining step is executed in response to a detection in said detection step.

12. An information processing method according to clam 10, further comprising the step of inputting data and instructions used for executing the program by the input device.

* * * * *

UNITED STATES PATENT AND TRADEMARK OFFICE
CERTIFICATE OF CORRECTION

PATENT NO. : 5,530,882
DATED : June 25, 1996
INVENTOR(S) : AKITOMO SASAKI ET AL.

It is certified that error appears in the above-identified patent and that said Letters Patent is hereby corrected as shown below:

AT [57] ABSTRACT

Line 5, "command" should read --commands--.

COLUMN 1

Line 28, "application" should read --applications--.

COLUMN 4

Line 34, "not" should read --not be--.

COLUMN 5

Line 23, "input/outout" should read --input/output--.

COLUMN 8

Line 27, "clam" should read --claim--.

Signed and Sealed this

Fourteenth Day of January, 1997

Attest:

BRUCE LEHMAN

Attesting Officer

Commissioner of Patents and Trademarks